(12) United States Patent
Watanabe et al.

(10) Patent No.: US 7,175,408 B2
(45) Date of Patent: Feb. 13, 2007

(54) MOLD MONITORING APPARATUS FOR INJECTION MOLDING MACHINE

(75) Inventors: Yoshio Watanabe, Nagano (JP); Hirokazu Ihara, Nagano (JP)

(73) Assignee: Nissei Plastic Industrial Co., Ltd., Sakaki-machi (JP)

( * ) Notice: Subject to any disclaimer, the term of this patent is extended or adjusted under 35 U.S.C. 154(b) by 397 days.

(21) Appl. No.: 10/411,273

(22) Filed: Apr. 11, 2003

(65) Prior Publication Data

US 2003/0194460 A1    Oct. 16, 2003

(30) Foreign Application Priority Data

Apr. 11, 2002   (JP)   ............... 2002-109355

(51) Int. Cl.
  *B29C 45/76*   (2006.01)
(52) U.S. Cl. ............ 425/169; 425/137; 425/139; 425/165
(58) Field of Classification Search ........... 425/136, 425/137, 139, 165, 169, 444, 556
  See application file for complete search history.

(56) References Cited

U.S. PATENT DOCUMENTS

| | | | | |
|---|---|---|---|---|
| 3,303,537 A | * | 2/1967 | Mislan | .............. 164/154.4 |
| 3,642,401 A | * | 2/1972 | Wilson | .............. 425/137 |
| 4,236,181 A | * | 11/1980 | Shibata et al. | .............. 348/130 |
| 4,841,364 A | * | 6/1989 | Kosaka et al. | .............. 348/86 |
| 5,326,028 A | * | 7/1994 | Kano et al. | .............. 236/49.3 |
| 5,928,578 A | * | 7/1999 | Kachnic et al. | .............. 264/40.1 |
| 6,592,354 B2 | * | 7/2003 | Kachnic et al. | .............. 425/169 |
| 6,699,413 B2 | * | 3/2004 | Kachnic | .............. 264/40.1 |

FOREIGN PATENT DOCUMENTS

| | | |
|---|---|---|
| JP | 63-126718 A | 5/1988 |
| JP | 50-30270 | 2/1993 |
| JP | 8-1302 | 1/1996 |

* cited by examiner

*Primary Examiner*—Joseph S. Del Sole
*Assistant Examiner*—Emmanuel S. Luk
(74) *Attorney, Agent, or Firm*—Birch, Stewart, Kolasch & Birch, LLP

(57) ABSTRACT

A mold monitoring apparatus for an injection molding machine captures an image of a cavity portion of an opened mold, and determines the state of the cavity portion by means of image processing. The apparatus includes a light emitting unit, an image capturing unit, and an image processing unit. The light emitting unit projects onto the cavity portion light rays other than visible light rays. The image capturing unit includes an image sensor for capturing reflection light rays that travel from the cavity portion to the image sensor via a filter for blocking visible light rays. The image processing unit determines the state of the cavity portion on the basis of an image signal output from the image sensor and through image processing.

17 Claims, 6 Drawing Sheets

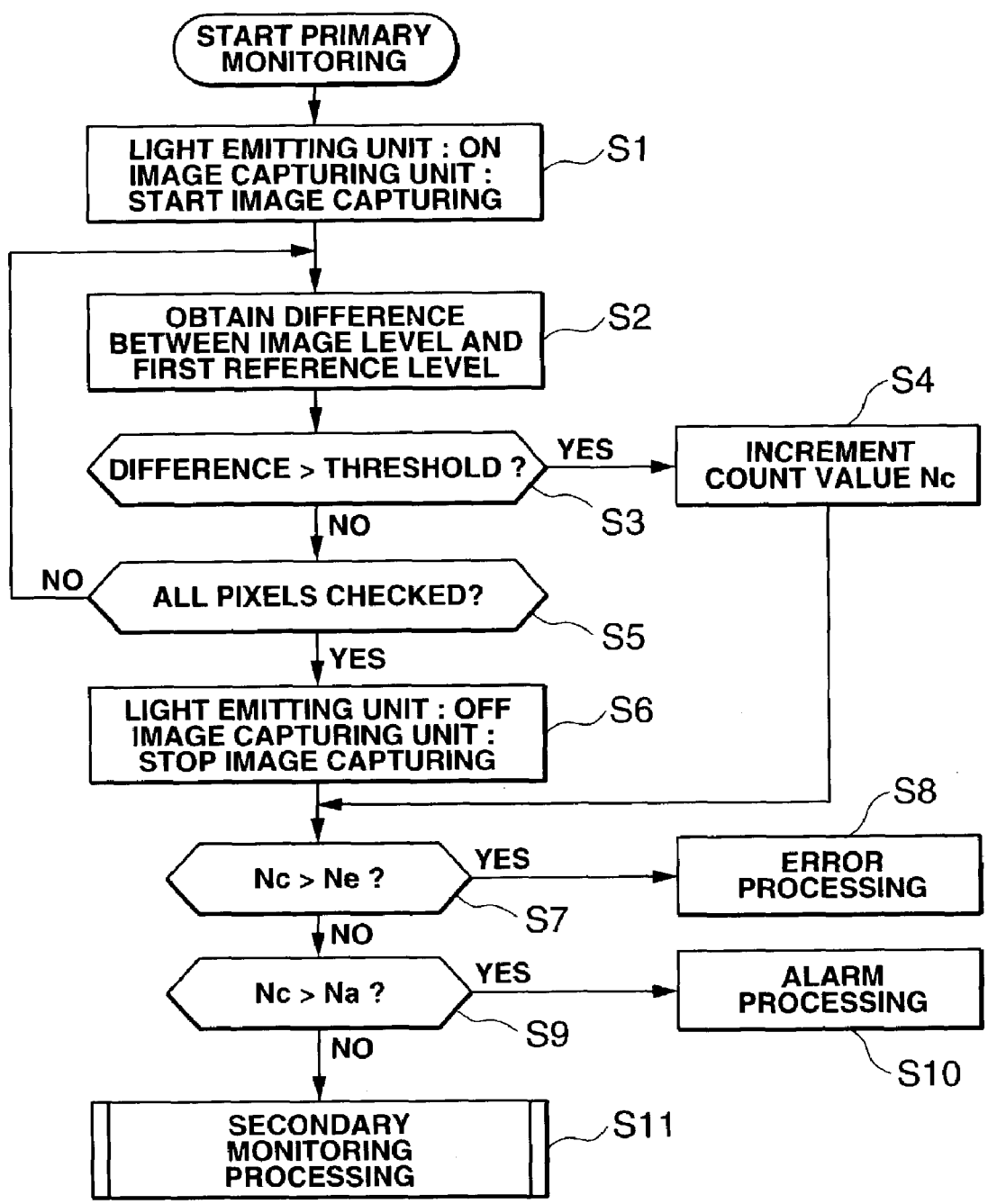

MOLD MONITORING APPARATUS FOR INJECTION MOLDING MACHINE

BACKGROUND OF THE INVENTION

1. Field of the Invention

The present invention relates to a mold monitoring apparatus for an injection molding machine, which apparatus captures an image of a cavity portion of an opened mold, and determines the state of the cavity portion by means of image processing.

2. Description of the Relevant Art

Conventionally, there has been known a method of capturing, by use of a video camera, an image representing the state of a mold, and comparing the brightness of the captured image with that of a previously stored reference image in order to determine whether a molded article is present or absent within the mold. However, this method involves a problem in that when the brightness (brightness level) in a space surrounding a molding machine varies due to on and off of electric lights or influence of external light, the method erroneously determines a normal state to be anomalous, or an anomalous state to be normal.

In order to solve the above-described problem, there has been proposed a mold monitoring apparatus (monitoring method) for an injection molding machine, which apparatus (method) captures an image of a cavity portion of an opened mold, and determines the state of the cavity portion by means of image processing (see Japanese Patent Application Laid-Open Open (kokai) No. 63(1988)-126718).

In the monitoring method disclosed in the publication, an image of a mold is divided into pixels; brightness of each pixel is detected; the image is then binarized; i.e., converted to a black-and-white image, while a previously set binarization brightness level is used as a reference; and the thus-obtained binarized (black-and-white) image is compared with a previously stored binarized image representing a normal state, wherein the darkest brightness level among all the pixels of the detected image is determined; when the darkest brightness level falls outside an allowable range previously set for darkest brightness level, injection molding operation is stopped; when the darkest brightness level falls within the allowable range, the darkest brightness level of the detected image is compared with the darkest brightness level among all the pixels of the previously stored image of the normal state; and when the level difference is greater than an allowable value, the previously set binarization brightness level is corrected; i.e., increased or decreased in accordance with the level difference, in order to properly perform binarization of the detected image.

However, in the above-described conventional monitoring method (monitoring apparatus) the following problems remain to be solved.

First, because of its operating principle, the conventional method (apparatus) cannot avoid influences of changes in brightness in a space around the molding machine. Therefore, erroneous operation cannot be completely avoided, and this imposes a limit on enhancement of reliability and safety.

Second, since influence of brightness is corrected at the time of image processing, extra processing must be performed, possibly resulting in impaired processing accuracy.

SUMMARY OF THE INVENTION

An object of the present invention is to provide a mold monitoring apparatus for an injection molding machine which can eliminate, in principle, influence of brightness in a space around a molding machine or influence of color of molded products, and reliably prevent malfunction or erroneous operation, to thereby enhance reliability and safety.

Another object of the present invention is to provide a mold monitoring apparatus for an injection molding machine which can simplify image processing and improve accuracy of the image processing.

In order to achieve the above objects, the present invention provides a mold monitoring apparatus for an injection molding machine, which apparatus captures an image of a cavity portion of an opened mold, and determines a state of the cavity portion by means of image processing, the apparatus comprising a light emitting unit for projecting onto the cavity portion light rays other than visible light rays; an image capturing unit including an image sensor for capturing reflection light rays that travel from the cavity portion to the image sensor via a filter for blocking visible light rays; and an image processing unit for determining the state of the cavity portion on the basis of an image signal output from the image sensor and through image processing.

By virtue of the above-described configuration, light rays other than visible light rays are projected from the light emitting unit onto the cavity portion. The reflection light rays from the cavity portion reach the image sensor of the image capturing unit after passing through the filter for blocking visible light rays, whereby the reflection light rays are captured by the image sensor. The image signal output from the image sensor is fed to the image processing unit. The image processing unit performs image processing on the basis of the image signal in order to determine the state of the cavity portion; e.g., whether a portion or the entirety of a molded product remains. Therefore, in principle the influence of brightness in a space around the molding machine; i.e., visible light rays from the space, are eliminated.

BRIEF DESCRIPTION OF THE DRAWINGS

FIG. 8 is a flowchart showing the steps of primary monitoring processing preformed by the mold monitoring apparatus.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

First, the configuration of a mold monitoring apparatus 1 according to the present embodiment will be described with reference to FIGS. 1 to 6.

Figure 1:
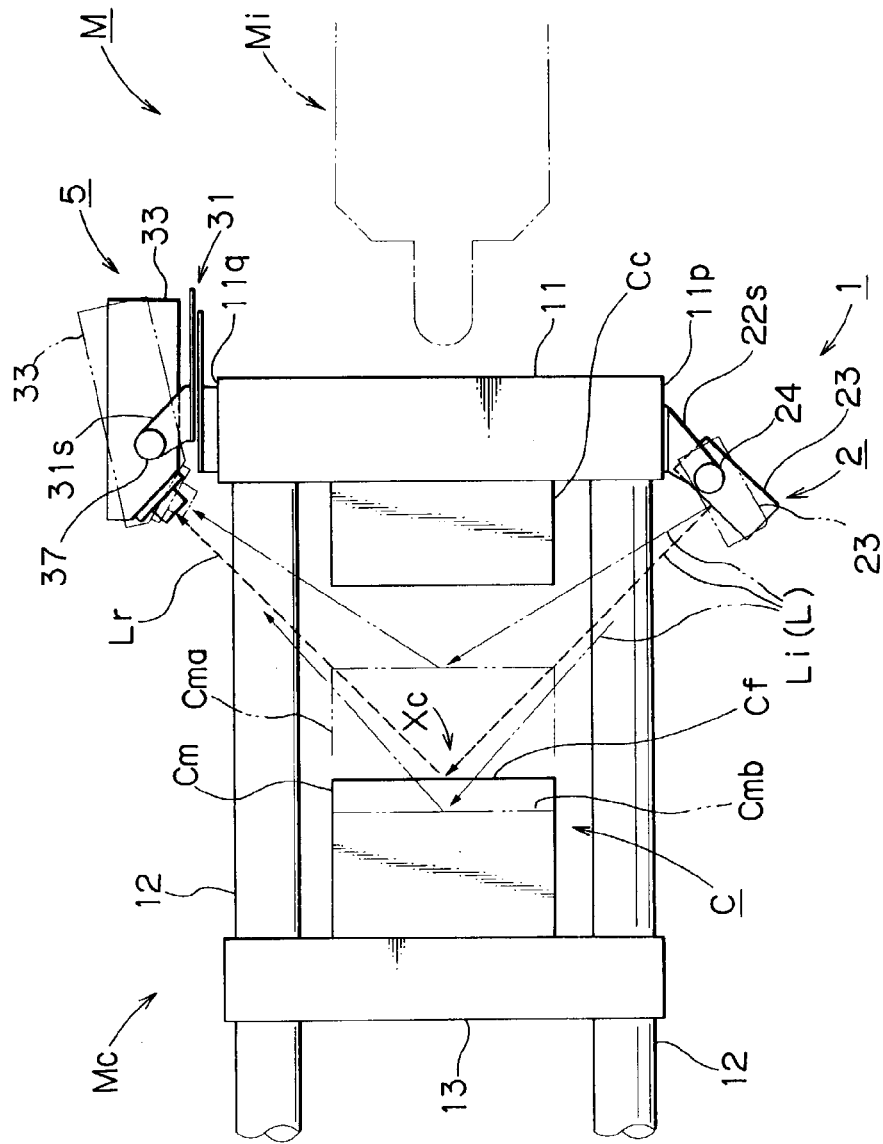
FIG. 1 is a plan view of an injection molding machine to which a mold monitoring apparatus according to an embodiment of the present invention is attached.
Figure 4:
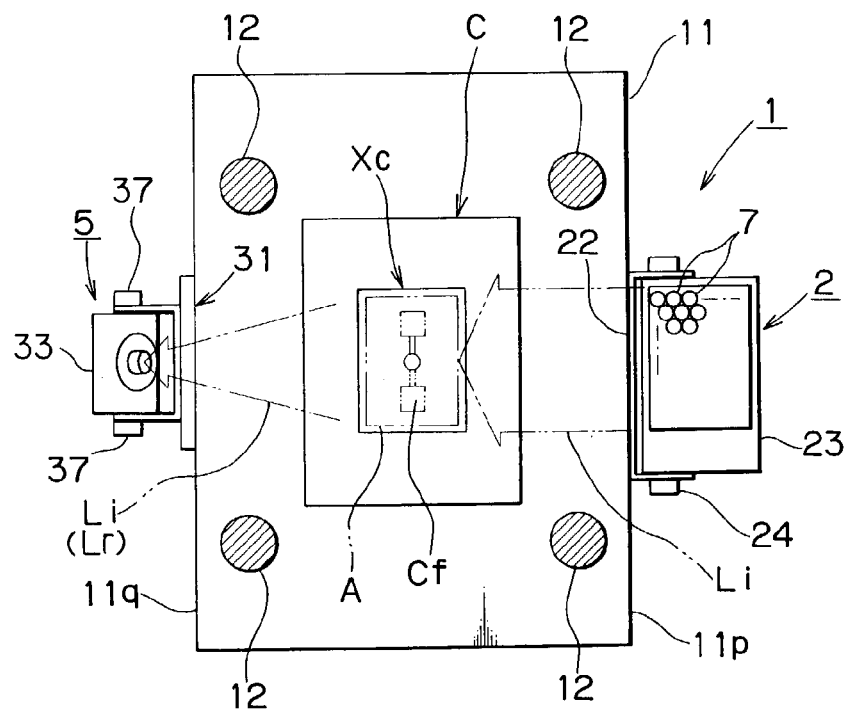
FIG. 4 is a front view of the injection molding machine to which the mold monitoring apparatus is attached.

FIGS. 1 and 4 show a portion of an injection molding machine M to which the mold monitoring apparatus 1 is attached. The injection molding machine M includes a mold clamping apparatus Mc. The mold clamping apparatus Mc includes a stationary platen 11; four tie bars 12 disposed between the stationary platen 11 and an unillustrated pressure receiving platen; and a movable platen 13 slidably supported by the tie bars 12. A stationary mold Cc is attached to the stationary platen 11, whereas a movable mold Cm is attached to the movable platen 13. The stationary mold Cc and the movable mold Cm constitute a mold unit C. By means of an unillustrated drive mechanism, the movable platen 13 is advanced and retracted relative to the stationary platen 11 to thereby close, clamp, and open the mold unit C. Notably, reference letter Mi denotes an injection apparatus; and Cf (FIG. 4, etc.) denotes a cavity of the mold unit C.

Meanwhile, the mold monitoring apparatus 1 includes a light emitting unit 2 and an image capturing unit 5. The light emitting unit 2 projects infrared rays Li (light rays L other than visible light rays) onto a cavity portion Xc. The image capturing unit 5 captures, by use of an image sensor 4, reflection infrared rays Li (regular reflection light Lr) which propagate from the cavity portion Xc and pass through a filter 3 (FIG. 3), which blocks visible light rays.

Figure 2:
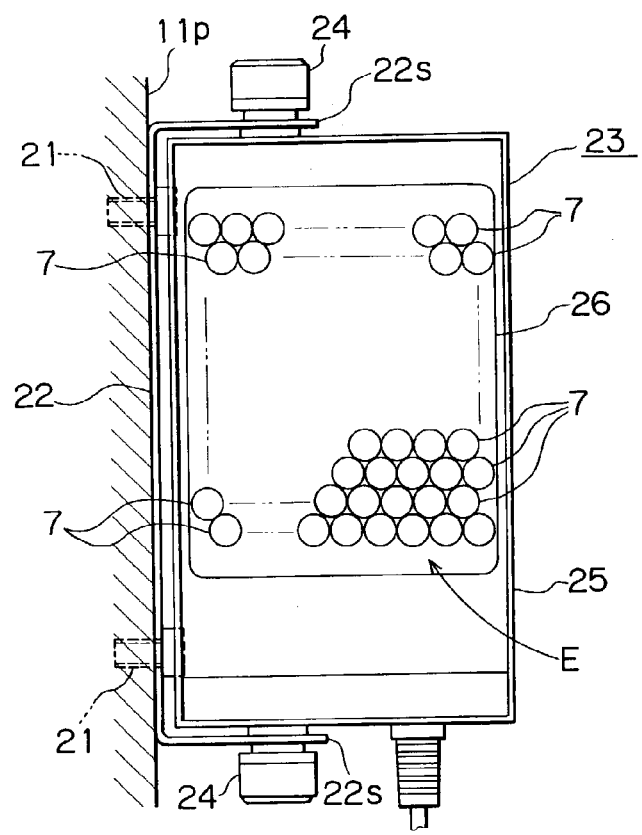
FIG. 2 is a front view of a light emitting unit of the mold monitoring apparatus.

The light emitting unit 2 is mounted to one side surface $11p$ of the stationary platen 11. As shown in FIG. 4, the mount point and the cavity portion Xc have the same vertical position. As shown in FIG. 2, the light emitting unit 2 has a bracket 22, which is fixed to the side surface $11p$ by use of a plurality of bolts 21. The bracket 22 has a pair of support arm portions $22s$, which perpendicularly extend from opposite side edges (upper and lower edges), respectively, of a base portion of the bracket 22; and a light emitting head (a main body of the light emitting unit) 23 is supported between the support arm portions $22s$. Specifically, the side walls (upper and lower walls) of the light emitting head 23 are supported by means of mount bolts 24, which are screwed into the side walls via the support arm portions $22s$. This configuration enables setting (changing) of the light projection angle of the light emitting head 23. Specifically, after the mount bolts 24 are loosened, the light projection angle of the light emitting head 23 is set or changed, and then the mount bolts 24 are tightened.

Figure 5:
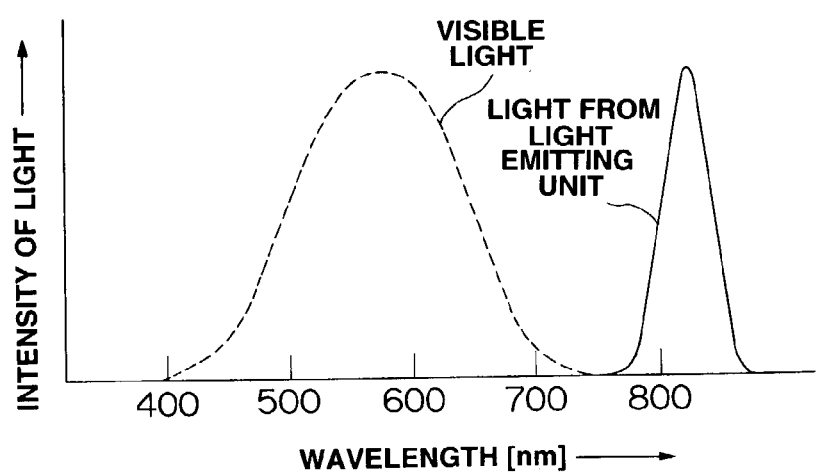
FIG. 5 is a characteristic diagram showing the relation between wavelength and intensity of infrared rays emitted from the light emitting unit of the mold monitoring apparatus.

The light emitting head 23 has a housing 25 which is formed in the shape of a flat rectangular parallelepiped, and whose one end face is opened. A light emitting board 26 is disposed inside the housing 25; and a large number of infrared light-emitting diodes 7 for emitting infrared rays Li are arranged on the light emitting board 26. Thus, the large number of infrared light-emitting diodes 7, each serving as a point light source, are integrated in order to constitute a surface light source E. As shown in FIG. 4, the size (shape) of the surface light source E is selected in consideration of a monitoring zone A set for the cavity portion Xc; specifically, the size (shape) is selected in such a manner that the area of the surface light source E becomes equal to or greater than that of the monitoring zone A. As shown in FIG. 2, the infrared light-emitting diodes 7 desirably assume a staggered arrangement. This arrangement increases the brightness of the light source E, and improves uniformity of the brightness. Further, a diffusion plate for diffusing emitted light is disposed inside the housing 25 in order to suppress attenuation of reflection light caused by polishing patterns on the mold unit C and enables uniform and stable irradiation. FIG. 5 shows the relation between wavelength and intensity of infrared rays Li emitted from the infrared light-emitting diodes 7 (light emitting unit 2), in comparison with visible light rays.

Figure 3:
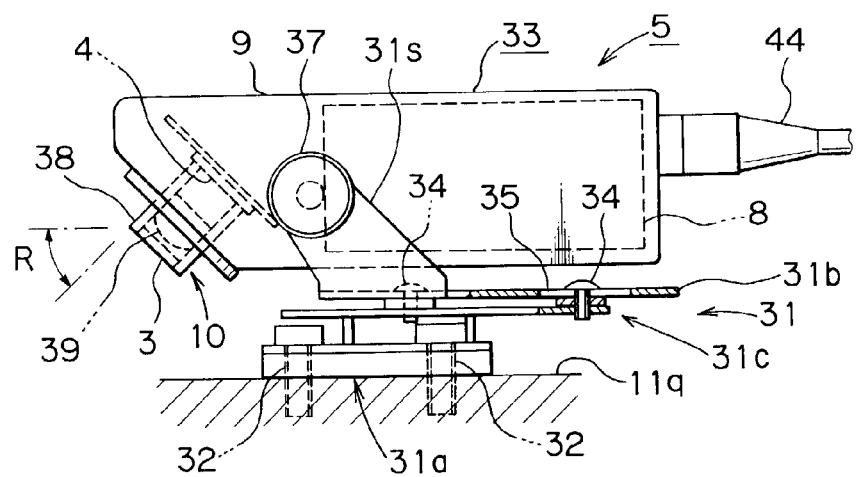
FIG. 3 is a plan view of an image capturing unit of the mold monitoring apparatus.

Meanwhile, the image capturing unit 5 is mounted to the other side surface $11q$ of the stationary platen 11. As shown in FIG. 4, the mount point and the cavity portion Xc have the same vertical position. As shown in FIG. 3, the image capturing unit 5 has a support mechanism 31 attached to the side surface $11q$. The support mechanism 31 includes an attachment section $31a$ fixed to the side surface $11q$ by use of a plurality of bolts 32; a bracket $31b$ for supporting an image capturing head (a main body of the image capturing unit) 33; and a position adjustment section $31c$ disposed between the bracket $31b$ and the attachment section $31a$. Through combined use of adjustment screws 34 and elongated holes 35, the position adjustment section $31c$ enables the bracket $31b$ to be moved relative to the attachment section $31a$ along the front-back direction for positional adjustment. The bracket $31b$ has a pair of support arm portions $31s$, which extend perpendicularly from opposite side edges (upper and lower edges), respectively, of a base portion of the bracket $31b$; and the image capturing head 33 is supported between the support arm portions $31s$. Specifically, the side walls (upper and lower walls) of the image capturing head 33 are supported by means of mount bolts 37, which are screwed into the side walls via the support arm portions $31s$. This configuration enables setting (changing) of the image-capturing angle of the image capturing head 33. Specifically, after the mount bolts 37 are loosened, the image-capturing angle of the image capturing head 33 is set or changed, and then the mount bolts 37 are tightened.

As described above, the light emitting unit 2 is attached to one side surface $11p$ of the stationary platen 11 of the mold clamping apparatus Mc; and the image capturing unit 5 is attached to the other side surface $11q$ of the stationary platen 11. This arrangement enables the image capturing unit 5 to capture regular reflection light Lr of the infrared rays Li emitted from the light emitting unit 2; i.e., reflection light produced under the conditions that the incident angle of the light emitted from the light emitting unit 2 with respect to a reference axis is the same as the reflection angle of the reflection light with respect to the reference axis.

The image capturing head 33 has a casing 9 which is formed in the shape of a rectangular parallelepiped and accommodates an auxiliary circuit 8. A sensing section 10 carrying an image sensor 4 is attached to the casing 9 at a predetermined angle R, whereby the amount of lateral projection of the image capturing unit 5 can be reduced. The sensing section 10 has an optical tube 38, in which a filter 3 for blocking visible light rays and a lens 39 are disposed, in this sequence from the front end; and the image sensor 4 is disposed behind the optical tube 38. A COMS image sensor which can easily decrease power consumption, size, and cost is desirably used for the image sensor 4.

Figure 6:
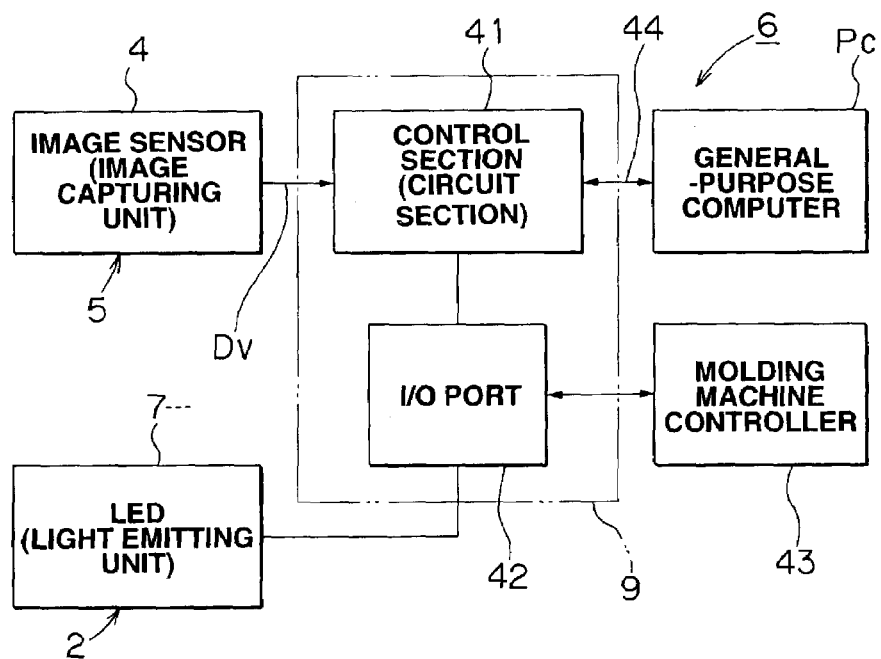
FIG. 6 is block diagram of an electric system of the mold monitoring apparatus.

Meanwhile, FIG. 6 shows the configuration of the electric system. Reference numeral 41 denotes a control section connected to the image sensor 4; and 42 denotes an input/output port of the control section 41. The control section 41 and the input/output port 42 are accommodated within the casing 9 of the image capturing head 33 as the above-described auxiliary circuit 8. The infrared light-emitting diodes 7 are connected to the control section 41 via the input/output port 42; and a molding machine controller 43 accommodated within the injection molding machine M is also connected to the control section 41 via the input/output port 42. The control section 41 is connected to a general-purpose computer (personal computer) Pc via a USB cable 44. The general-purpose computer Pc constitutes an image processing unit 6 which determines the state of the cavity portion Xc on the basis of an image signal Dv obtained from the image sensor 4 and through image processing.

Next, the manner of use and operation of the mold monitoring apparatus 1 according to the present embodiment will be described with reference to FIGS. 1 to 9.

First, the angles of the light emitting head 23 and the image capturing head 33 are set. Here, the opened movable mold Cm is assumed to be located at a position indicated by a sold line in FIG. 1. In this state, the angle (light projection angle) of the light emitting head 23 is adjusted in such a manner that the infrared rays Li emitted from the light emitting head 23 illuminate the cavity portion Xc; i.e., the entirety of the monitoring zone A shown in FIG. 4. As described above, the light projection angle can be set easily through loosening and tightening the mount screws 24. Thus, the infrared rays Li are obliquely radiated onto the cavity portion Xc.

Subsequently, the image-capturing angle of the image capturing head 33 is adjusted. Specifically, as shown in FIG. 1, the image-capturing angle is adjusted in such a manner that the image capturing head 33 can capture regular reflection light Lr of the infrared rays Li propagating from the cavity portion Xc. Since capturing of such regular reflection light Lr enables detection on the basis of differences in reflectance, the S/N ratio can be improved, and influence of light from other directions can be reduced. As described above, the image-capturing angle can be set easily through loosening and tightening the mount screws 37. Even when the position of the opened mold Cm is changed to a position Cma or Cmb as indicated by imaginary lines in FIG. 1, the angles of the light emitting head 23 and the image capturing head 33 can be easily set through the same operation.

Subsequently, a reference level is set. Specifically, an image of a cavity Cf is captured in a state in which a regular (non-defective) molded product is present in the cavity Cf, and registered as first reference level data. Further, an image of the cavity Cf is captured in a state in which no molded product is present in the cavity Cf, and registered as second reference level data. During the registration operation, first, the infrared light-emitting diodes 7 are turned on. As a result, infrared rays Li are projected onto the cavity portion Xc, and undergo regular reflection at the cavity portion Xc. The reflected infrared rays Li (regular reflection light Lr) enter the sensing section 10 of the image capturing head 33 and reach the image sensor 4. Visible light rays from a space surrounding the molding machine are blocked by the filter 3, so that only the reflected infrared rays Li (regular reflection light Lr) reach the image sensor 4. The image signal Dv output from the image sensor 4 is registered in the memory of the general-purpose computer Pc via the control section 41.

Next, a monitoring method that is actually employed in a molding process will be described. During a period in which the injection molding machine M is operating, various control signals are output from the molding machine controller 43, and are fed to the general-purpose computer Pc via the input/output port 42 and the control section 41. Here, it is assumed that an operation of opening the mold C has been completed subsequent to completion of an injection-charging step and a cooling step. When a mold-opening completion signal is fed to the general-purpose computer Pc upon completion of the mold opening operation, the general-purpose computer Pc performs primary monitoring processing. The primary monitoring processing is monitoring processing to be performed during the period between completion of the mold opening operation and the start of ejection operation. This processing enables determination of molding defects, such as presence of an uncharged portion in a molded product.

FIG. 8 is a flowchart showing the steps of the primary monitoring processing. Upon receipt of the mold-opening completion signal, the general-purpose computer Pc outputs an image-capturing start command to thereby turn the infrared light-emitting diodes 7 of the light emitting unit 2 on and to cause the image capturing unit 5 to start image capturing operation (step S1). As a result, the infrared rays Li are projected from the light emitting unit 2 onto the cavity portion Xc, and undergo regular reflection at the cavity portion Xc. The reflected infrared rays Li (regular reflection light Lr) enter the sensing section 10 of the image capturing head 33 and reach the image sensor 4. At this time, visible light rays from a space surrounding the molding machine are blocked by the filter 3, so that only the reflected infrared rays Li (regular reflection light Lr) reach the image sensor 4. The image signal Dv output from the image sensor 4 is fed to the general-purpose computer Pc via the control section 41. Notably, since infrared lays Li are used, the operator does not experience a strange sensation or an unpleasant sensation, even when the light emitting unit 2 is on.

Meanwhile, the general-purpose computer Pc compares the brightness level of the first pixel with the above-described first reference level to thereby obtain a difference therebetween (step S2). Further, the general-purpose computer Pc compares the difference with a threshold (step S3). When a portion of a molded product corresponding to that pixel has been molded properly, the relation "Difference≦Threshold" is satisfied. When that portion of the molded product has a defect, such as a charge defect, the relation "Difference>Threshold" is satisfied for that portion. In the latter case, the general-purpose computer Pc increments by one a count value Nc for counting defective points (step S4). The same processing is repeated for successive pixels up to the final pixel (steps S5, S2, etc.).

When the general-purpose computer Pc has received image signals Dv for a single screen, the general-purpose computer Pc outputs an image-capturing stop command to thereby turn the infrared light-emitting diodes 7 of the light emitting unit 2 off and to cause the image capturing unit 5 to stop the image capturing operation (step S6). Since the light emitting unit 2 is turned on only when an image of the cavity portion Xc is captured, power consumption can be reduced. Further, the general-purpose computer Pc compares the count value (total count value) Nc with an error level Ne which has been previously set for error determination. When Nc>Ne, the general-purpose computer Pc determines that an error has occurred. In this case, the general-purpose computer Pc stops the operation of the injection molding machine M, and performs error processing such as display of an error message (steps S7 and S8). When no error has occurred, the general-purpose computer Pc compares the count value Nc with a previously set alarm level Na. When Nc>Na, the general-purpose computer Pc determines that an error would occur if the operation were continued. In this case, the general-purpose computer Pc stops the operation of the injection molding machine M, and performs alarm processing such as display of an alarm message as a preliminary warning (steps S9 and S10). When the primary monitoring processing reveals that the cavity portion Xc is normal, the general-purpose computer Pc performs secondary monitoring processing (step S11). Notably, in the monitoring processing, the determination as to whether cavity portion Xc is normal is performed through comparison of each difference with the threshold and comparison of the count value (representing the number of defective points) with the reference levels. Therefore, determination accuracy can be improved.

Figure 9:
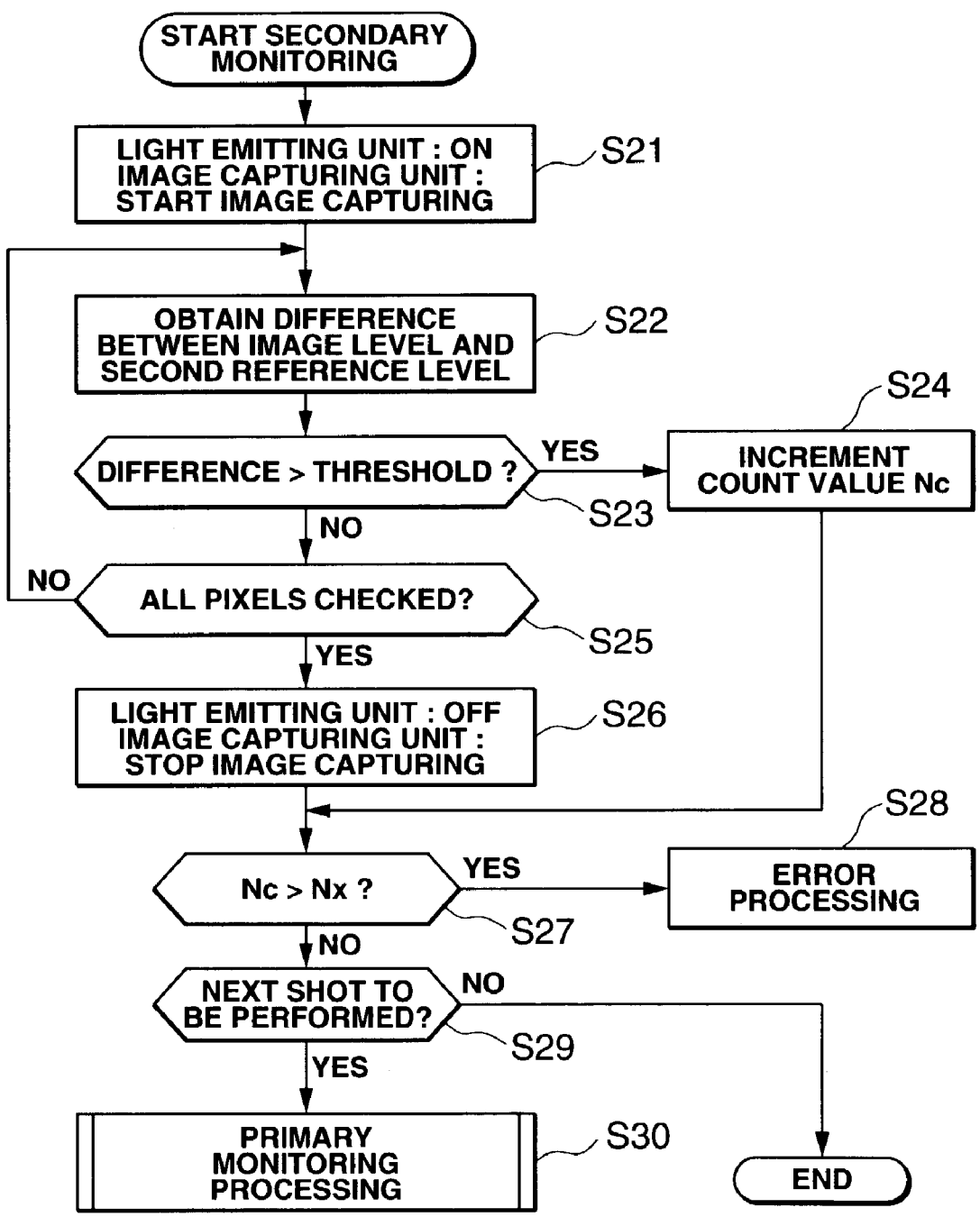
FIG. 9 is a flowchart showing the steps of secondary monitoring processing performed by the mold monitoring apparatus.

FIG. 9 is a flowchart showing the steps of the secondary monitoring processing, which is monitoring processing to be performed after completion of ejecting operation. This processing enables determination as to whether the ejecting operation has been performed properly. Upon receipt of an ejection completion signal, the general-purpose computer Pc outputs an image-capturing start command to thereby turn the infrared light-emitting diodes 7 of the light emitting unit 2 on and to cause the image capturing unit 5 to start image capturing operation (step S21). As a result, the infrared rays Li are projected from the light emitting unit 2 onto the cavity portion Xc, and undergo regular reflection at the cavity portion Xc. The reflected infrared rays Li (regular reflection light Lr) enter the sensing section 10 of the image capturing head 33 and reach the image sensor 4. At this time, visible light rays from a space surrounding the molding machine are blocked by the filter 3, so that only the reflected infrared rays Li (regular reflection light Lr) reach the image sensor 4. The image signal Dv output from the image sensor 4 is fed to the general-purpose computer Pc via the control section 41.

Meanwhile, the general-purpose computer Pc compares the brightness level of the first pixel with the above-described second reference level to thereby obtain a difference therebetween (step S22). Further, the general-purpose computer Pc compares the difference with a threshold (step S23). When a portion of the wall surface of the cavity corresponding to that pixel is not covered by a molded-product remaining portion B, which will be described later, the relation "Difference≦Threshold" is satisfied. When that portion is covered by the molded-product remaining portion B, the relation "Difference>Threshold" is satisfied for that portion. In the latter case, the general-purpose computer Pc increments by one a count value Nc for counting defective points (step S24). The same processing is repeated for successive pixels up to the final pixel (steps S25, S22, etc.). When the general-purpose computer Pc has received image signals Dv for a single screen, the general-purpose computer Pc outputs an image-capturing stop command to thereby turn the infrared light-emitting diodes 7 of the light emitting unit 2 off and to cause the image capturing unit 5 to stop the image capturing operation (step S26).

Figures 7A, 7B, 7C:
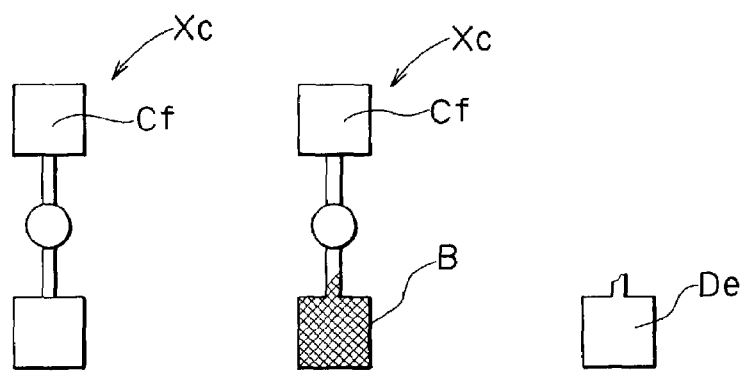
FIGS. 7(*a*) to 7(*c*) are illustrations used for describing image processing performed by the mold monitoring apparatus.

Further, the general-purpose computer Pc compares the count value (total count value) Nc with an error level Nx which has been previously set for error determination. When Nc>Nx, the general-purpose computer Pc determines that an error has occurred. In this case, the general-purpose computer Pc stops the operation of the injection molding machine M, and performs error processing such as display of an error message (steps S27 and S28). FIG. 7(a) shows the cavity portion Xc in a state in which a molded product is not present in the cavity Cf; and FIG. 7(b) shows the cavity portion Xc in a state in which a portion of a molded product; i.e., a molded-product remaining portion B, is present in the cavity Cf. In the latter case, the molded-product remaining portion B is captured as a defective area De, as shown in FIG. 7(c). Since the molded-product remaining portion B has a reflectance different from that of the wall surface of the cavity Cf, portions which correspond to pixels and which are located in the defective area De shown in FIG. 7(c) are counted as defective points, so that the relation Nc>Nx is satisfied, and error processing similar to that performed in the primary monitoring processing is performed. Meanwhile, when the cavity portion Xc is normal and a next shot is to be performed, the general-purpose computer Pc performs the primary monitoring processing in accordance with the procedure shown in FIG. 8 (steps S29 and S30). When a next shot is not to be performed, the general-purpose computer Pc ends the monitoring processing (step S29).

In the mold monitoring apparatus 1 of the present embodiment, infrared rays Li are projected from the light emitting unit 2 onto the cavity portion Xc, and reflected infrared rays Li (regular reflection light Lr) propagating from the cavity portion Xc reach the image sensor 4 after passing through the filter 3 for blocking visible light. Therefore, the influence of brightness in a space around the molding machine; i.e., visible light rays from the space, and the influence of color of molded products are eliminated. Therefore, malfunction or erroneous operation is reliably prevented, whereby reliability and safety are enhanced. In addition, since extra processing such as correction processing is unnecessary, image processing can be simplified, and accuracy of the image processing can be improved.

While the present invention has been described with reference to the preferred embodiment, the present invention is not limited thereto. Regarding structural details, shape, quantity, material, numerical value, among others, modifications and any omission or addition may be possible as needed without departing from the scope of the invention. For example, in the present embodiment, infrared rays are used as light rays other than visible light rays. However, light rays used in the present invention are not limited to infrared rays, and other types of light rays such as ultraviolet rays or far-infrared rays may be used. Although the above-described embodiment exemplifies the case where the light emitting unit 2 includes a large number of light-emitting diodes 7, use of other light-emitting means is not excluded. Further, although the above-described embodiment exemplifies the case where a general-purpose computer (personal computer) is used to constitute the image processing unit 6, a micro computer or the like which can be incorporated into the casing 9 may be used.

What is claimed is:

1. A mold monitoring apparatus for an injection molding machine, comprising:
   a light emitting unit configured to project light rays other than visible light rays onto a cavity portion of an opened mold;
   an image capturing unit including an image sensor configured to capture reflection light rays that travel from the cavity portion to the image sensor via a filter configured to block visible light rays; and an image processing unit configured to determine a state of the cavity portion on the basis of an image signal output from the image sensor and through image processing,
   wherein the image capturing unit captures regular reflection light from the cavity portion,
   wherein the image signal includes a plurality of pixels,
   wherein the light emitting unit is attached to a first side surface of the stationary platen of the mold clamping apparatus,
   wherein the image capturing unit is attached to a second side surface of a stationary platen of a mold clamping apparatus, and wherein the image capturing unit includes a support mechanism attached to the second side surface of the stationary platen and having a position adjustment section for adjusting the position of a main body of the image capturing unit along a longitudinal direction of the image capturing unit.

2. The mold monitoring apparatus according to claim 1, wherein the light rays are infrared rays.

3. The mold monitoring apparatus according to claim 1, wherein the light emitting unit includes a large number of light-emitting diodes arranged within a plane selected in accordance with a monitoring zone of the cavity portion.

4. The mold monitoring apparatus according to claim 3, wherein the light emitting unit includes a housing in which the large number of light-emitting diodes are disposed, and a diffusion plate configured to diffuse emitting light is disposed within the housing.

5. The mold monitoring apparatus according to claim 1, wherein the light emitting unit obliquely projects the light rays onto the cavity portion.

6. The mold monitoring apparatus according to claim 1, wherein the light emitting unit includes a bracket attached to the first side surface of the stationary platen, and a main body of the light emitting unit is supported by a mount screw which is screwed into a side surface of the main body via a support arm portion of the bracket, whereby a light projection angle of the main body of the light emitting unit is made adjustable.

7. The mold monitoring apparatus according to claim 1, further comprising a controller configured to turn on the light emitting unit only when an image of the cavity portion is captured.

8. The mold monitoring apparatus according to claim 1, wherein the support mechanism includes a bracket, and a main body of the image capturing unit is supported by a mount screw which is screwed into a side surface of the main body via a support arm portion of the bracket, whereby an image capturing angle of the main body of the image capturing unit is made adjustable.

9. The mold monitoring apparatus according to claim 8, wherein the main body of the image capturing unit includes a casing in which an auxiliary circuit is accommodated, and a sensing section having an image sensor is attached to the casing at a predetermined angle.

10. The mold monitoring apparatus according to claim 5, wherein the light emitting unit is attached to a first side surface of the stationary platen of the mold clamping apparatus.

11. A mold monitoring apparatus for an injection molding machine, comprising:
   a light emitting unit configured to project light rays other than visible light rays onto a cavity portion of an opened mold;
   an image capturing unit configured to capture reflection light rays that travel from the cavity portion to the image capturing unit via a filter configured to block visible light rays; and
   an image processing unit configured to determine a state of the cavity portion based on an image signal output from the image capturing unit,
   wherein the light emitting unit includes an adjusting mechanism configured to change an angle that the light rays are projected onto the cavity portion of the opened mold, and
   wherein the image capturing unit includes a first adjusting mechanism configured to adjust the image capturing unit along a longitudinal direction thereof so as to be moved forwards or backwards relative to the cavity portion of the opened mold, and includes a second adjusting mechanism configured to adjust a capture angle of the image capturing unit.

12. The mold monitoring apparatus according to claim 11, wherein the light emitting unit is adjusted via the adjusting mechanism to obliquely project the light rays onto the cavity portion.

13. The mold monitoring apparatus according to claim 11, wherein the first adjustment mechanism of the image capturing unit comprises:
   an attachment section fixed to a stationary platen of a mold clamping apparatus clamping the opened mold;
   a bracket configured to support the image capturing unit;
   a position adjustment section disposed between the bracket and the attachment section; and
   adjustment screws connecting the bracket and the position adjustment section.

14. The mold monitoring apparatus according to claim 11, further comprising a controller configured to turn on the light emitting unit only when an image of the cavity portion is captured.

15. The mold monitoring apparatus according to claim 1, further comprising:
   a computer configured to obtain a difference between a pixel of the output image signal and a pixel of an image signal corresponding to a non-detective molded product, compare the difference with a predetermined threshold, increment a count value when the difference is greater than the predetermined threshold, compare the incremented count value with a predetermined count value, and output an error signal when the incremented count value is greater than the predetermined count value.

16. The mold monitoring apparatus according to claim 15, wherein the computer compares the incremented count value with the predetermined count value after all pixels in the image signal have been checked.

17. The mold monitoring apparatus according to claim 1, wherein the light rays exclude visible light rays having wavelengths from 400 nm to 750 nm.

* * * * *